United States Patent [19]

Brown et al.

[11] Patent Number: 5,525,226

[45] Date of Patent: Jun. 11, 1996

[54] PREFORMED GASKET WITH RETAINING TABS

[75] Inventors: Gene W. Brown; Kenton L. Jorgenson, both of Kearney, Nebr.

[73] Assignee: Baldwin Filters, Inc., Kearney, Nebr.

[21] Appl. No.: 323,104

[22] Filed: Oct. 14, 1994

[51] Int. Cl.⁶ .................................................. B01D 27/08
[52] U.S. Cl. .................... 210/443; 210/DIG. 17; 277/166; 277/186; 277/189
[58] Field of Search .................................... 277/166, 186, 277/189; 210/450, DIG. 17, 435, 440, 443, 444

[56] References Cited

U.S. PATENT DOCUMENTS

| | | | |
|---|---|---|---|
| 3,062,557 | 11/1962 | Underwood | 277/166 |
| 5,301,958 | 4/1994 | Covington | 277/183 |

FOREIGN PATENT DOCUMENTS 431097  7/1935  United Kingdom .................. 277/186

OTHER PUBLICATIONS

Sketch of Fram/Caterpillar "L" shaped gasket. Date Unknown.

Primary Examiner—Matthew O. Savage
Attorney, Agent, or Firm—Leydig, Voit & Mayer, Ltd.

[57] ABSTRACT

A resilient molded gasket adapted to be received in a preformed annular groove having an inner sidewall formed at an oblique angle relative to the base of the groove and having an enlarged area defined at the junction of the inner sidewall and the base. The gasket includes a generally circular body and at least two integrally molded tabs. The body is sized to be slidably received in the groove. The tabs are adapted to engage and then snap past a lip formed on the free end of the inner sidewall and then to be received in the enlarged area of the groove so as to retain the gasket in the groove while permitting rotation of the gasket.

7 Claims, 2 Drawing Sheets

PREFORMED GASKET WITH RETAINING TABS

BACKGROUND OF THE INVENTION

This invention relates generally to a preformed gasket and, more specifically, to a resilient molded gasket adapted to be retained in a preformed groove.

The present invention is especially suitable for use with components such as spin-on oil filters having a preformed gasket secured in a groove to insure that an unused gasket is in place when the filter is installed. Spin-on filters are made with an open end adapted to thread onto a mounting adaptor and having either a rectangular, lathe-cut gasket or a molded gasket secured into a groove formed in the open end. The gasket is typically located near the outer periphery of the open end to establish a face seal between the filter and the mounting adaptor.

Conventional gaskets utilized in spin-on filters are lathe-cut gaskets made from a relatively hard rubber material. Lathe-cut gaskets are typically less expensive than molded gaskets, and the relatively high durometer of a lathe-cut gasket permits the gasket to be mechanically secured into a groove by forming intermittently-spaced staking tabs in the sidewalls of the groove. The staking tabs protrude into the gasket to grab and hold the gasket in the groove.

Staking a lathe-cut gasket is a relatively complicated and expensive process. The formation of the staking tabs must be held within relatively close tolerances to avoid damage to the gasket that would affect the ability of the gasket to establish a seal. In addition, the nature of the staking operation requires that the width of the groove be held to relatively close tolerances and be formed so that there is very little radial clearance between the gasket and the sidewalls of the groove. Despite these disadvantages, staking a lathe-cut gasket is generally preferred over the prior alternative procedures (discussed below) associated with mechanically securing molded gaskets in a groove.

Apart from the manufacturing considerations, the use of a lathe-cut gasket may cause difficulties during the installation and removal of a filter. Specifically, lathe-cut gaskets can result in the need to apply a relatively high tightening torque when the filter is seated against the mounting adaptor. The rectangular lathe-cut gasket presents a relatively large, flat sealing face for sealing to the sealing surface of the mounting adaptor, and this results in relatively high friction between the seal and the mounting adaptor. Staking also prevents the gasket from rotating with the groove. As a result, a substantial portion of the torque applied to seat the filter is absorbed by shear deformation of the gasket and by the friction between the gasket and the mounting adaptor. Additionally, the relative hardness of a lathe-cut gasket and the small radial clearance between the gasket and the groove make it difficult to compress the gasket.

During the time that the filter is installed, long-term exposure to heated oil may cause a lathe-cut gasket to permanently swell. As a result, the flat sealing surface of the lathe-cut gasket tends to "weld" to the sealing surface of the mounting adaptor and thus removal of the filter may require substantial more torque than did the installation of the filter.

Molded gaskets, on the other hand, offer advantages over lathe-cut gaskets with regard to the installation and removal of spin-on filters. Molded gaskets may be formed with rounded corners which permit the gasket to be more easily compressed. The rounded corners also avoid having a relatively large, flat sealing surface in initial contact with the sealing surface of the mounting adaptor. Additionally, since molded gaskets are more easily compressed, the radial clearance between the sidewalls of the groove and the gasket may be increased to permit the gasket to rotate more freely in the groove. As a result of the above factors, the torque required to install or remove a filter having a molded gasket is substantially less than the torque required to install or remove a filter having a lathe-cut gasket.

Prior molded gaskets are preformed with an L-shaped cross-section. The leg of the "L" typically extends radially inwardly from the body of the gasket and rests on the base of the groove. To secure the L-shaped gasket in the groove, a portion of the inner sidewall of the groove is turned approximately 90 degrees toward the outer sidewall, such portion being generally parallel with the base of the groove so as to trap the leg between the base and the deformed portion of the sidewall.

While prior L-shaped gaskets are axially retained in a groove without the need for a staking operation, an additional operation beyond simply inserting the gasket into the groove is required. In one procedure, the groove, including the turned-in portion of the inner sidewall, may be preformed and the gasket is installed into the preformed groove. In this instance, the gasket must be stretched so as to slip the inside periphery of the leg past the radially outward end portion of the turned-in sidewall. Alternately, the gasket may be installed into a groove having substantially parallel sidewalls. In such an instance, the inner sidewall is formed or rolled-over to capture the leg of the gasket in the groove. In either case, elimination of the staking operation requires substitution of another operation to retain the gasket in the groove.

SUMMARY OF THE INVENTION

The general aim of the present invention is to provide a new and improved molded gasket which is capable of being retained in an annular groove and which may be more easily installed in the groove.

A more detailed objective is to achieve the fore-going by providing a gasket having integrally molded and radially projecting tabs which are adapted to be received in a groove having an inner sidewall formed with a reverse draft angle to retain the gasket in the groove.

A still more detailed objective is to provide resilient tabs sized to snap past the free end of the inner sidewall as the gasket is axially inserted into the groove, the tabs then returning to their relaxed positions and being received near the base of the groove.

Another objective of the invention is to provide two sets of axially spaced tabs, either set of tabs being capable of being received in the groove and being capable of retaining the gasket in the groove so as to permit the gasket to be installed from either one position or from an inverted position.

These and other objects and advantages of the invention will become more apparent from the following detailed description when taken in conjunction with the accompanying drawings.

Figure 1:
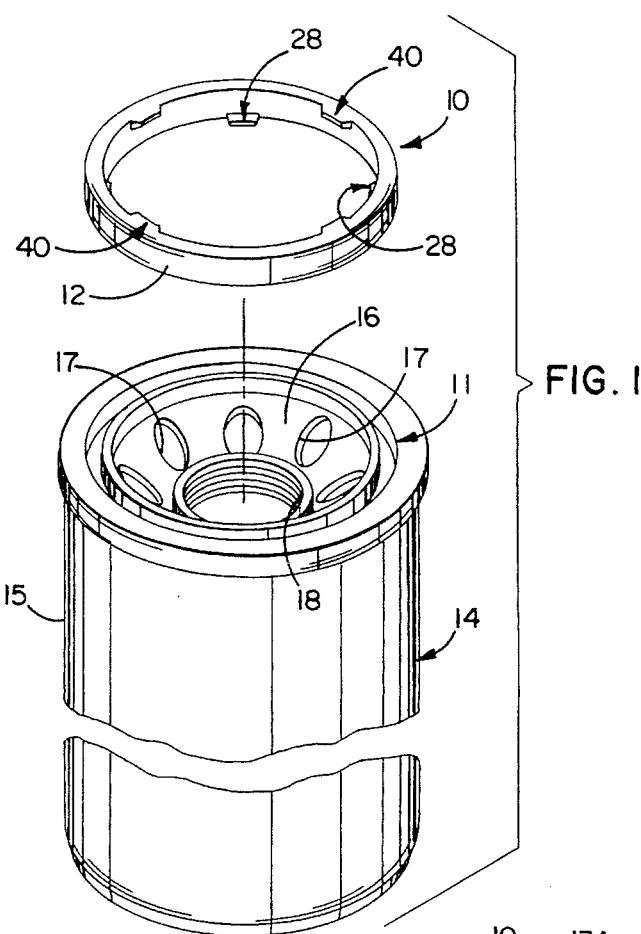
FIG. 1 is a perspective view of a new and improved gasket incorporating the unique features of the present invention and shows an oil filter having a groove for receiving the gasket.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

Figure 2:
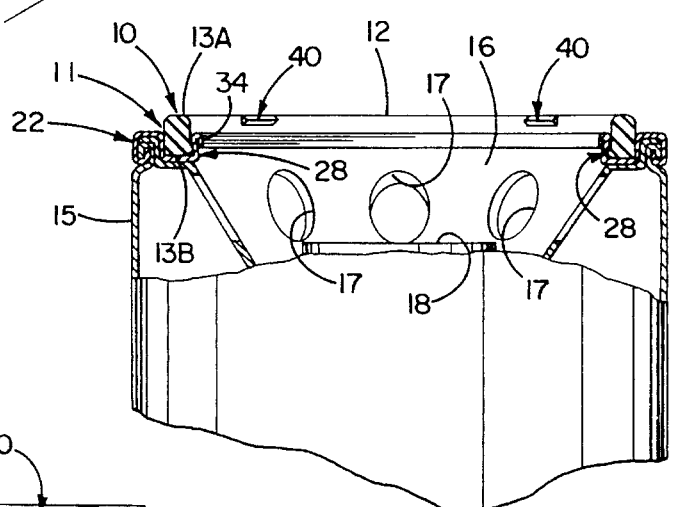
FIG. 2 is a side elevational view of the filter with certain parts of the filter being broken away and shown in cross-section.

For purposes of illustration, the present invention is shown in the drawings as embodied in a preformed annular gasket 10 (FIG. 1) adapted to be received in an annular groove 11 for establishing a face seal between two adjacent members. The gasket 10 is molded from a resilient material and is formed with a generally circular body 12 having rounded upper and lower peripheries 13A and 13B (FIG. 2), respectively. The gasket is especially useful for sealing between the open end of a filter 14 and a mounting adaptor (not shown). The filter illustrated is a so-called spin-on filter of the type commonly used for filtering hydraulic fluid, lubricating oil and the like.

Figure 3:
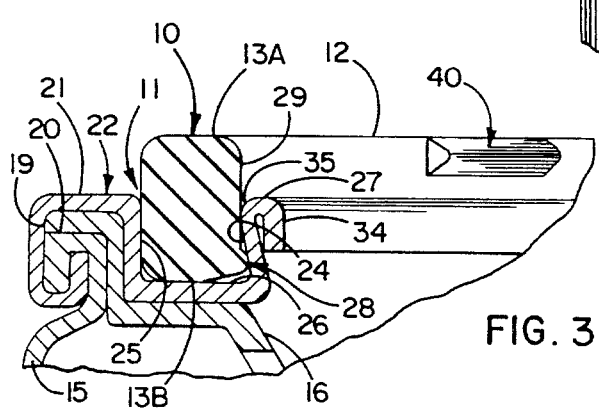
FIG. 3 is an enlarged cross-sectional view of certain parts shown in FIG. 2.
Figure 4:
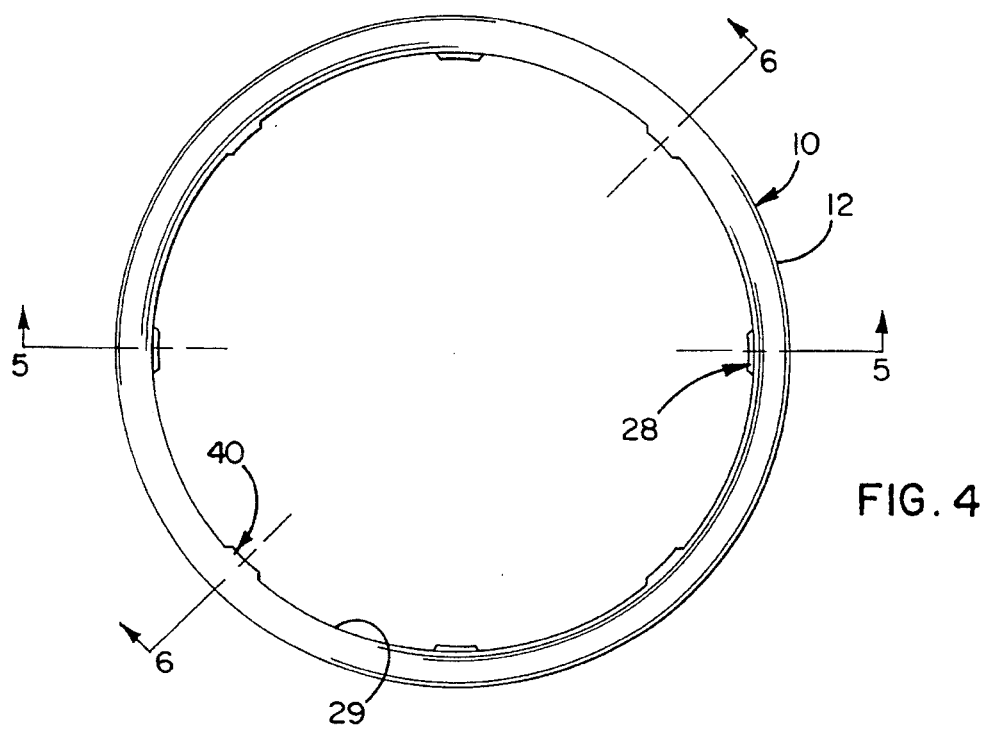
FIG. 4 is an enlarged plan view of the gasket.

The filter 14 includes a deep drawn steel housing or canister 15 having an open end and a closed end. Located in the open end of the canister is a baseplate 16 formed with inlet openings 17, an internally threaded sleeve 18, and a radially projecting outer periphery 19 (FIG. 3). The outer periphery of the baseplate is trapped between the open end portion 20 of the canister and a radially extending outer peripheral portion 21 of a member in the form of a stamped sheet metal seaming lid 22. A seaming operation circumferentially interlocks the outer periphery of the lid with the open end portion of the canister to secure the lid and the baseplate in the open end of the canister. The groove 11 is preformed in the lid and is located radially outwardly of the openings 17.

The groove 11 is formed with two generally concentric and opposing inner and outer sidewalls 24 and 25, respectively, and a bottom wall or base 26. The base is formed perpendicular to the axis of the filter 14. The outer sidewall 25 is formed generally parallel to the axis of the filter.

The mounting adaptor includes an externally threaded neck (not shown) adapted to be received in the threaded sleeve 18. The mounting adaptor supplies contaminated oil to the inlet openings 17 and receives filtered oil from the filter 14 through a bore formed in the neck. During installation of the filter, the sleeve is threaded onto the neck. The height of the gasket is greater than the depth of the groove so that the gasket normally projects beyond the lid 22. The rounded upper and lower peripheries 13A and 13B, respectively, of the gasket allow the gasket to be compressed relatively easily as the filter is seated against the mounting adaptor. With the foregoing arrangement, the gasket 10 is axially compressed and establishes a seal radially outwardly of the inlet openings 17 to prevent leakage of contaminated oil to the outside environment. A representative filter of this general type is more fully disclosed in Cudaback U.S. Pat. No. 4,872,976.

A new filter 14 is typically assembled and packaged with a new gasket 10 to insure that an unused gasket is available when the filter is installed. Preferably, the gasket is axially secured in the groove 11 to insure that the gasket is in place when the filter is threaded onto the mounting adaptor.

The conventional gasket utilized in a spin-on filters is a rectangular lathe-cut gasket which is secured in the groove by forming staking tabs in the inner sidewall 24 to grab and hold the gasket. Prior molded gaskets have met with limited acceptance because either the gasket must be radially stretched so that a portion of the gasket can be slipped into a preformed groove adapted to trap the gasket or, alternately, the inner sidewall must be deformed to trap a portion of the gasket after the gasket is located in the groove.

In accordance with the present invention, the molded gasket 10 is formed with radially extending and angularly spaced tabs 28 which are adapted to resiliently deflect past a lip 27 of the groove 11 and to be received in a preformed and enlarged area of the groove so as to retain the gasket in the groove. As a result, the gasket may be installed into a preformed groove by simply aligning the gasket with the groove and then snapping the gasket into the groove without need of stretching the gasket.

More specifically, at least two and preferably four angularly spaced tabs 28 are integrally molded with the body 12 of the gasket 10. The tabs extend radially inwardly from and circumferentially along the inner periphery 29 the body. Each tab is preferably formed with a generally triangular cross-section defined by upper and lower surfaces 30 and 31, respectively, and by the inner periphery of the body. The surfaces 30 and 31 extend obliquely relative to the axis of the gasket and relative to each other from the inner edge 32 of the tab. The tabs are located in a plane which is perpendicular to the central axis of the gasket and are positioned on the body so as to be received in an area adjacent the junction of the base 26 and the inner sidewall 24 when the gasket is seated in the groove 11.

Preferably, the inner sidewall 24 of the groove 11 is formed at an oblique angle relative to the axis of the filter 14 and the groove 11, and is inclined so as to approach the outer sidewall 25 upon progressing from the base 26 toward the lip 27. Such an inclined wall is commonly referred to as being formed at a reverse draft angle. As a result of the inclined wall, the width of the groove increases upon progressing toward the base so as to define an enlarged area at the base of the groove for receiving the tabs 28. Additionally, a restricted annular opening is defined between the lip 27 and the outer sidewall 25.

During the forming of the seaming lid 22, a flange 34 initially projects radially inwardly from the free end of the inner sidewall 24 which, at that time, is parallel to the outer sidewall 25. The lip 27 is defined at the junction of the inner sidewall and the flange as the flange is turned downwardly and as the free end portion of the inner sidewall is deformed toward the outer side-wall. Advantageously, a lead-in radius 35 to the groove 11 is formed on the upper margin of the lip. As a result, the minimum width of the annular opening to the groove is defined by the radial distance between the inner sidewall and the outer sidewall, just below the lead-in radius.

In carrying out the invention, the body 12 of the gasket 10 is formed with a radial thickness less than the minimum width of the groove 11 so that the body, absent the tabs 28, is capable of being slidably received in the restricted annular opening in the groove. The tabs are sized so that the overall radial thickness of the gasket, i.e., the thickness of the body plus the radial width of a tab, is greater than the minimum width of the groove. Specifically, the tabs are sized to engage the lead-in radius 35 of the lip 27 when the body of the gasket is aligned with the groove. Additionally, the tabs are sized to be slidably received in the enlarged area defined at the junction of the inner sidewall 24 and the base 26 of the groove. In other words, the maximum or enlarged annular width of the groove as established at the enlarged base portion of the groove between the inner and outer sidewalls 24 and 25, respectively, is greater than the overall thickness of the gasket. As a result, the gasket is freely rotatable within the groove after it has been installed in the groove and yet the tabs are capable of engaging the inclined inner sidewall to restrict axial removal of the gasket from the groove and to generally retain the gasket in the groove.

The size of the tubs 28, i.e., circumferential length, the radial width, and the thickness of the tabs, is determined by a balance between (i) the requirement that the tabs resiliently deflect or snap past the lip 27 when the gasket 10 is installed into the groove 11 and (ii) the need to retain the gasket in the groove. The size of the tabs must be kept relatively small to keep the resistance to deflection to a minimum. On the other hand, the tabs must be sufficiently stiff to prevent the gasket from falling out of the groove. The tabs are not intended to permanently secure the gasket in the groove but instead are intended only to prevent the gasket from inadvertently falling out of the groove before the filter is installed. To this end, the tabs are sized to resist sliding of the gasket in the event that the filter is turned upside down and gravity tends to pull the gasket out of the groove.

With the foregoing arrangement, the gasket 10 is installed into the groove 11 by first aligning the body 12 with the annular opening defined by the groove and then simply pressing the gasket into the groove. As the tabs 28 engage the lead-in radius 35, they resiliently deflect and then snap past the lip 27 to allow the body to be slidably received in the groove. As the gasket becomes seated in the groove, the tabs relax into the enlarged area of the groove near the junction of the base 26 and the inner sidewall 24.

The number and size of tabs 28 that is necessary to meet the above requirements will depend on normal design considerations such as, among other things, the thickness, the width, and the diameter of the gasket 10, and the density and the durometer hardness of the gasket material. Generally, the size of the tabs will be relatively small. For example, it has been found that, for a gasket having an inside diameter of 3.761", a width of 406", and a radial thickness of 0.215", a set of four equally sized and spaced tabs having a combined length of 1.28" will retain the gasket in the groove. In this instance, the gasket is molded from nitrile rubber having a durometer hardness of 70, and the tabs have a radial width of 0.04" and have an included angle of 30 degrees between the upper and lower surfaces 30 and 31, respectively. Additionally, the groove has a height of 0.282" and a width of 0.271" at the base. The sidewall is formed at an angle of 9.4 degrees relative to the axis of the filter 14.

Figure 5:
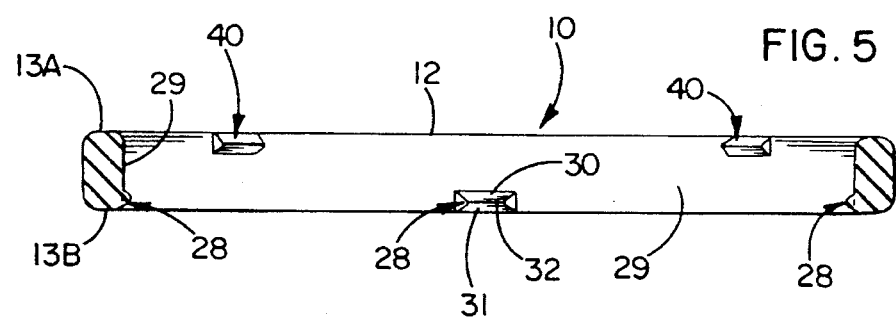
FIGS. 5 and 6 are enlarged cross-sectional views taken substantially along the lines 5—5 and 6—6, respectively, of FIG. 4.
Figure 6:
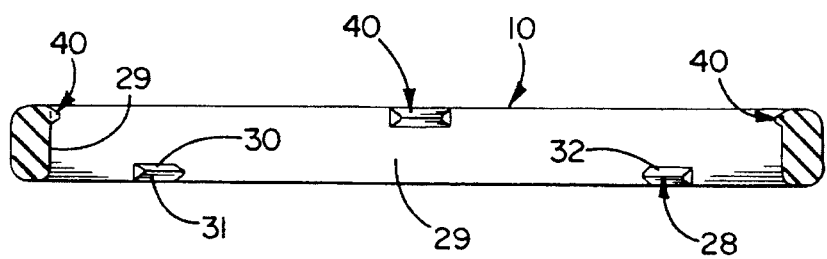

Advantageously, another set of tabs 40 (FIGS. 5 and 6) preferably identical to the tabs 28 may be integrally molded in the gasket 10 to enhance the ease of assembly of the filter 14. The tabs 28 and 40 are axially spaced on the inner periphery 29 of the gasket. Additionally, the tabs of each set are located in a plane parallel to and equally spaced from a plane extending through the longitudinal center of the body 12, i.e., extending perpendicular to the axis of the body. The distance between the sets of tabs is greater than the distance between the base 26 and the lip 27 so that one set of tabs is located outside the groove when the tabs; of the other set are received in the groove. To enhance moldability of the gasket 10 and to ease separation of the mold halves, the inner periphery 29 of the gasket is preferably formed as a cylindrical surface and the tabs 40 alternate angularly with the tabs 28 around the inner periphery of the gasket.

With the foregoing arrangement, either set of tabs 28, 40 is capable of being received into the groove 11 and either set of tabs is capable of retaining the gasket 10 in the groove. The gasket may be inserted into the groove with the lower surface 13B being presented to the groove, or alternately, the gasket may be flipped or inverted so that the upper surface 13A is inserted into the groove. As a result, the gasket may be simply picked up and snapped into the groove without need of considering the orientation of the gasket.

From the foregoing, it will be apparent that the present invention brings to the art a new and improved molded gasket 10 having uniquely configured tabs 28 which are capable of snapping past the lip 27 of a preformed groove 11 and which are capable of engaging the inner sidewall 24 of the groove to retain the gasket in the groove while permitting rotation of the gasket. The assembly time savings resulting from the second set of tabs 40 is realized with virtually no additional expense and with an insignificant weight penalty and, in addition, the two sets of tabs insure that the gasket will not be improperly installed. Accordingly, the gasket 10 is more quickly and easily installed in a preformed groove than prior molded gaskets and is more quickly and easily secured in a groove than conventional lathe-cut gaskets.

We claim:

1. The combination of, (A) a member having a preformed annular groove, and (B) a preformed annular gasket, said groove having a bottom wall and first and second generally opposing sidewalls, said first sidewall having a lip, said groove having an annular opening of predetermined area defined between said lip and said second sidewall and having an enlarged annular area defined between said first and second sidewalls adjacent said bottom wall, wherein said enlarged annular area is larger than said predetermined area, said gasket being molded from a resilient material and comprising a generally circular body adapted to be slidably received in said groove, and at least two angularly spaced tabs molded integrally with and extending generally radially from said body, said tabs being adapted to engage said lip and then to resiliently deflect past said lip as said body is axially inserted into said groove so as to permit said body to be received into said groove without the need of stretching said body, said tabs being received in said enlarged annular area adjacent said first sidewall whereby said tabs are engageable with said first sidewall to restrict axial removal of said body from said groove.

2. The combination of, (A) a member having a preformed annular groove, and (B) a preformed annular gasket, said groove having a bottom wall and first and second opposing sidewalls, said first sidewall having a lip and being inclined so as to progress toward said second sidewall upon progressing away from said bottom wall, said gasket being molded from a resilient material and comprising a generally circular body adapted to be slidably received in said groove, and at least two angularly spaced tabs molded integrally with and extending generally radially from said body, said tabs being adapted to engage said lip and then to resiliently deflect past said lip as said body is axially inserted into said groove so as to permit said body to be received into said groove without the need of stretching said body, said tabs being located so as to be positioned adjacent the junction between said bottom wall and said inclined sidewall whereby said tabs allow said body to rotate in said groove while being engageable with said inclined sidewall to restrict axial removal of said body from said groove.

3. The combination recited in claim 2 wherein said tabs comprise a first set of tabs located in an plane perpendicular to the central axis of said body, and wherein said gasket further comprises a second set of at least two additional angularly spaced tabs molded integrally with and extending generally radially from said body, the tabs of said second set being located in a second plane parallel to and axially spaced from said first plane, said planes being equally spaced from a parallel plane extending through the longitudinal center of said body whereby said body may be inserted into said groove when either in a first position or in an inverted second position and will be retained in said groove by one of said sets of tabs.

4. The combination recited in claim 3 in which said first and second planes are separated by a distance greater than the distance between said outer lip and said bottom of said groove whereby the tabs of one of said sets are located outside of the groove when the tabs of said other set are located in said groove.

5. A gasket as recited in claim 3 wherein said body includes an axially extending surface and wherein said tabs extend generally radially from said surface.

6. For use in an oil filter, a member having a preformed annular groove, and a preformed annular gasket located in said groove, said gasket being molded from a resilient material, said gasket comprising a generally circular body and at least two angularly spaced tabs, said tabs being integrally molded with and extending generally radially from said body, said groove being defined by two concentric and generally opposing walls and by a base, at least one of said walls being inclined obliquely relative to the axis of said groove and approaching the other of said walls upon progressing from said base so as to define an enlarged base portion and a restricted annular opening, said restricted opening being sized to slidably receive said body, said tabs engaging said one wall and snapping past said restricted opening as said body is axially inserted into said groove so as to permit said body to be received into said groove without need of deforming said body, said enlarged base portion being sized to slidably receive said tabs as said tabs snap past said restricted opening whereby said gasket is rotatably received and axially restricted in said groove.

7. The combination recited in claim 2 wherein said tabs are formed with a generally triangular cross-section defined in part by first and second surfaces inclined obliquely relative to the axis of said body and relative to each other.

\* \* \* \* \*